(12) United States Patent
Ezzat

(10) Patent No.: US 8,229,965 B2
(45) Date of Patent: Jul. 24, 2012

(54) SYSTEM AND METHOD FOR MAXIMIZING EDIT DISTANCES BETWEEN PARTICLES

(75) Inventor: Tony Ezzat, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 272 days.

(21) Appl. No.: 12/751,678

(22) Filed: Mar. 31, 2010

(65) Prior Publication Data

US 2010/0328342 A1 Dec. 30, 2010

Related U.S. Application Data

(63) Continuation-in-part of application No. 12/495,540, filed on Jun. 30, 2009, now Pat. No. 8,055,693.

(51) Int. Cl.
G06F 7/00 (2006.01)
G06F 17/27 (2006.01)

(52) U.S. Cl. .......................... 707/796; 704/9

(58) Field of Classification Search .................. 707/736, 707/741, 75, 758, 791, 999.001–999.004, 707/796; 704/7, 9
See application file for complete search history.

(56) References Cited

U.S. PATENT DOCUMENTS

| | | | | |
|---|---|---|---|---|
| 6,073,099 A * | 6/2000 | Sabourin et al. | ........... | 704/256.6 |
| 6,581,034 B1 * | 6/2003 | Choi et al. | .................... | 704/238 |
| 7,013,276 B2 * | 3/2006 | Bickley et al. | ................ | 704/255 |
| 7,089,188 B2 * | 8/2006 | Logan et al. | ................... | 704/270 |
| 7,181,398 B2 * | 2/2007 | Thong et al. | .................... | 704/254 |
| 7,219,056 B2 * | 5/2007 | Axelrod et al. | ............... | 704/235 |
| 7,702,509 B2 * | 4/2010 | Bellegarda | ..................... | 704/258 |
| 7,831,911 B2 * | 11/2010 | Ramsey | ....................... | 715/257 |
| 2003/0182101 A1 * | 9/2003 | Lambert | .......................... | 704/1 |
| 2003/0187643 A1 * | 10/2003 | Van Thong et al. | ........... | 704/254 |
| 2005/0071148 A1 * | 3/2005 | Huang et al. | ..................... | 704/4 |
| 2005/0251536 A1 * | 11/2005 | Harik | ............................. | 707/200 |
| 2007/0150279 A1 * | 6/2007 | Gandhi et al. | ................ | 704/258 |
| 2009/0019002 A1 * | 1/2009 | Boulis | ............................... | 707/3 |

OTHER PUBLICATIONS

Robert A. Wagner, Michael J. Fischer, The String-to-String Correction Problem, Journal of the ACM (JACM), v.21 n. 1, p. 168-173, Jan. 1974 [doi>10.1145/321796.321811].*

(Continued)

Primary Examiner — Robert Timblin
(74) Attorney, Agent, or Firm — Dirk Brinkman; Gene Vinokur

(57) ABSTRACT

Embodiments of the invention disclose a system and a method for transforming a set of particles in an output set of particles representing a set of words suitable for use in an information retrieval system. The method generates, for each particle in the set of particles, combinations of parts of a particle, and replaces the particle in the set of particles with the parts of a combination maximizing a total minimum edit distance (MED) of the set of particles. For example, the method determines a MED of each particle in the set of particles, determines the total MED of the set of particles as summations of the MED of each particle, and then determines the combination maximizing the total MED of the set of particles.

19 Claims, 12 Drawing Sheets

OTHER PUBLICATIONS

Whittaker, E.W.D.; Van Thong, J.M.; Moreno, P.J.; , "Vocabulary independent speech recognition using particles," Automatic Speech Recognition and Understanding, 2001. ASRU '01. IEEE Workshop on , vol., no., pp. 315-318, 2001 doi: 10.1109/ASRU.2001.1034650 URL: http://ieeexplore.ieee.org/stamp/stamp.jsp?tp=&arnumber=1034650&isnumber=22205.*

Whittaker et al., "Particle-Based Language Modelling," International Conference on Speech and Language Processing (ICSLP), 2000.

Logan et al. "Appoarches to Reduce the Effects of OOV Queries on Indexed Spoken Audio," Member IEEE, Transactions on Multimedia, vol. 7, No. 5, Oct. 2005; pp. 899-906.

Gouvea et al. "Word Particles Applies to Information Retrieval," Mitsubishi Electric Research Labs; 201 Broadway, Cambridge, MA 02139.

Bo-Ren Bai et al. "Syllable-Based Chinese Text/Spoken Document Retrieval Using Text/Speech Queries," Dept. of Electrical Engineering Nation Taiwan University; International Journal of Pattern Recognition and Artificial Intelligence, vol. 14, No. 5 (2000).

* cited by examiner

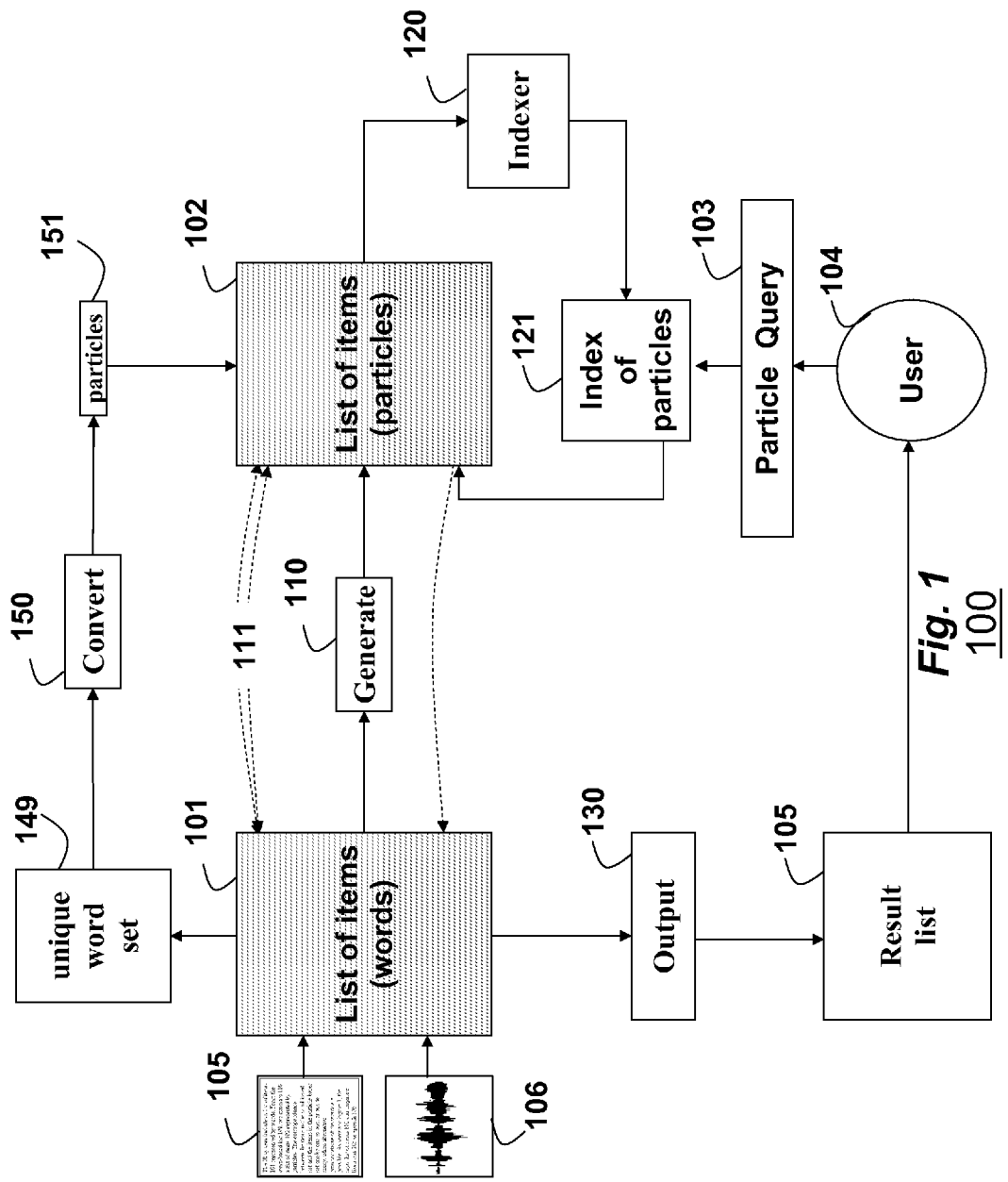

| ID | Item |
|---|---|
| 1090 | MCDONALDS |
| 1031 | RITE AID |
| 3421 | AASHIANI RESTAURANT |

*Fig. 2A*

| word | phonemes |
|---|---|
| HOURGLASS | AW R G L AE S |
| HOURLY | AW R L IY |
| HOURS | AW R Z |
| HOUSE | HH AW S |
| HOUSEHOLD | HH AW S HH OW L D |
| HOUSENKA | HH AW S EH NG K AH |
| HOUSENKA(2) | HH AW S EH N K AH |
| HOUSES | HH AW Z AH Z |
| HOUSES(2) | HH AW S IH Z |
| HOUSING | HH AW Z IH NG |
| HOUSTON | HH Y UW S T AH N |
| HOUSTON(2) | HH AW S T AH N |

*Fig. 2B*

| word | particles |
|---|---|
| HOURGLASS | AW_R + G_L_AE_S |
| HOURLY | AW_R + L_IY |
| HOURS | AW_R + Z |
| HOUSE | HH_AW_S |
| HOUSEHOLD | HH_AW_S + HH_OW_L_D |
| HOUSENKA | HH_AW_S + EH_NG + K_AH |
| HOUSENKA(2) | HH_AW + S_EH_N + K_AH |
| HOUSES | HH_AW_S + IH_Z |
| HOUSES(2) | HH_AW + Z + AH + Z |
| HOUSING | HH_AW + Z + IH_NG |
| HOUSTON | HH_AW_S + T_AH_N |
| HOUSTON(2) | HH_Y_UW + S + T_AH_N |

*Fig. 3*
*300*

| ID | Item |
|---|---|
| 1090 | M_AE_K_AH_D_AA_N_AH_L_D_Z |
| 1031 | R_AY_T+EY_D |
| 3421 | AA+SH_IY+AE_N_AH+R_E_S_T_R_AA_N_T |

401 → ID column
402 → Item column

*Fig. 4*
*400*

| particle | phonemes |
|---|---|
| AH | AH |
| AW_R | AW R |
| IH_NG | IH NG |
| IH_Z | IH Z |
| G_L_AE_S | G L AE S |
| HH_AW_S | HH AW S |
| HH_OW_L_D | HH OW L D |
| HH_Y_UW | HH Y UW |
| K_AH | K AH |
| S_EH_N | S EH N |
| T_AH_N | T AH N |
| Z | Z |

501 — particle
502 — phonemes

| PARTICLES | MIN EDIT DISTANCE |
|---|---|
| a | 1 |
| ab | 1 |
| abcd ⟵ 830 | 2 |
| de | 2 |
| TOTAL MED | 6 |

FIG. 8

"abcd" = "a" | "bcd":

| PARTICLES | MIN EDIT DISTANCE |
|---|---|
| a | 1 |
| ab | 1 |
| bcd | 3 |
| de | 2 |
| TOTAL MED | 7 |

FIG. 9

SYSTEM AND METHOD FOR MAXIMIZING EDIT DISTANCES BETWEEN PARTICLES

RELATED APPLICATION

This application is a continuation in part of U.S. patent application Ser. No. 12/495,540, now U.S. Pat. No. 8,055,693 "Method for Retrieving Items Represented by Particles from an Information Database," filed by Ezzat et al., on Jun. 30, 2009.

FIELD OF THE INVENTION

This invention relates generally to information retrieval, and in particular to transforming of a set of particle using maximization of edit distances between particles.

BACKGROUND OF THE INVENTION

Information retrieval (IR) systems typically include a large list of items, such as geographic points of interest (POI), or music album titles. The list is accessed by an index. Input to the index is a query supplied by a user. In response to the query, the IR system generates a result list that best matched the query. The result list can be rank ordered according various factors. The result list, index, query and result list are typically represented by words. The input list, query and result list be textual or spoken.

Spoken queries are used in environments where a user cannot use a keyboard, e.g., while driving, or the user interface includes a microphone. In those environments, an automatic speech recognizer (ASR) is used to convert speech to words.

The ASR uses two basic data structures, a pronunciation dictionary of words, and a language model of the words. Usually, the IR system represents the words phonetically as phonemes, e.g., RESTAURANT is represented as "R EH S T R AA N T." Phonemes refer to the basic units of sound in a particular language. The phonemes can include stress marks, syllable boundaries, and other notation indicative of how the words are pronounced.

The language model describes the probabilities of word orderings, and is used by the ASR to constrain the search for the correct word hypotheses. The language model can be an n-gram. If the n-grams are bigrams, then the bigram lists the probabilities such as P("BELL"|"TACO"), which is the probability that the word "BELL" follows the word "TACO." The language model can also be a finite state grammar, where the states in the grammar represent the words that can appear at each state, and the transitions between states represent the probability of going from one state to another state.

There are two main problems with word-based IR.

First, important words for the IR are typically infrequent identifier words. For example, in an item POI "MJ'S RESTAURANT", the important identifier word is "MJ'S." Frequently, these identifier words are proper nouns from other languages. For example, the word "AASHIANI" in the item "AASHIANI RESTAURANT" is from the Hindi language. Another way these identifier words emerge is through combination, as with "GREENHOUSE." Modifying the roots of words also increases the size of the vocabulary. In general, the number of infrequent but important identifier words is very large.

In addition, important identifier words are often mispronounced or poorly represented by the language model. Accurate statistics for the n-grams also are generally unavailable. Hence, the probability of recognizing important infrequent words is low, and the word sequences are often incorrect. This leads to poor recall performance by the IR system.

Second, the computational load for word-based IR systems increases with the size of the list and index, and the performance of system becomes unacceptable for real-time retrieval.

SUMMARY OF THE INVENTION

Embodiments of the invention provide a method for retrieving items in an information retrieval (IR) database represented by particles. The number of unique particles is much smaller than the number of unique words, e.g., smaller by at least an order of magnitude. This improves the performance of an automatic speech recognition (ASR) system, leading to a decrease in recognition time by as much as 50%. Surprisingly, even though the number of particles is decreased dramatically when compared with the number of words, and the throughput increases likewise, the performance of IR system measured by the recall rate is improved by as much as 2%.

The embodiments of the invention are based on the realization that for the operations of the information retrieval (IR) systems it is advantageous to represent a set of words with the particles that are as different from each other as possible. For example, having particles that are as different from each other as possible allows for accurate recognition during ASR. Moreover, the embodiments are based on the further realization, that the difference between the particles can be measured using edit distance.

One embodiment of the invention discloses a method for transforming a set of particles formed by at least part of a set of items in an output set of particles, wherein the set of items represents a set of words suitable for use in an information retrieval system. The method generates, for each particle in the set of particles, combinations of parts of a particle, and replaces the particle in the set of particles with the parts of a combination maximizing a total minimum edit distance (MED) of the set of particles. For example, the method determines a MED of each particle in the set of particles, determines the total MED of the set of particles as summations of the MED of each particle, and then determines the combination maximizing the total MED of the set of particles.

Another embodiment discloses a method for generating an output set of particles representing a set of words, comprising the steps of: determining a set of particles from the set of words; generating combinations of parts of a particle in the set of particles; replacing the particle in the set of particles with the parts of a combination maximizing a total minimum edit distance (MED) of the set of particles; and repeating the generating and the replacing for each particle in the set of particles to generate the output set of particles, wherein the steps of the method are performed by a processor.

Yet another embodiment discloses a system for transforming a set of particles in an output set of particles, representing a set of words, comprising: a transformation module configured to determine, for each particle in the set of particle, a combination of parts of the particle maximizing a total minimum edit distance (MED) of the set of particles; and a processor configured to replace the particle in the set of particles with the parts of the combination.

One variation of this embodiment includes means for determining a MED of each particle in the set of particles; means for determining the total MED of the set of particles;

and means for determining the combination maximizing the total MED of the set of particles.

BRIEF DESCRIPTION OF THE DRAWINGS

FIG. 1 is a block diagram of an information retrieval system according to embodiments of the invention;

FIG. 2A a table of an index of items of interest, written in terms of words;

FIG. 2B is a table of a pronunciation dictionary of words from the index;

FIG. 3 is a table of an example of a mapping from words to particles according to embodiments of the invention;

FIG. 4 is a table of an example of an index of items of interest, written in terms of particles, according to embodiments of the invention;

FIG. 5 is a table of a pronunciation dictionary of particles;

FIGS. 8-11 are tables showing transformations of particles.

DETAILED DESCRIPTION OF THE PREFERRED EMBODIMENT

Figure 6:
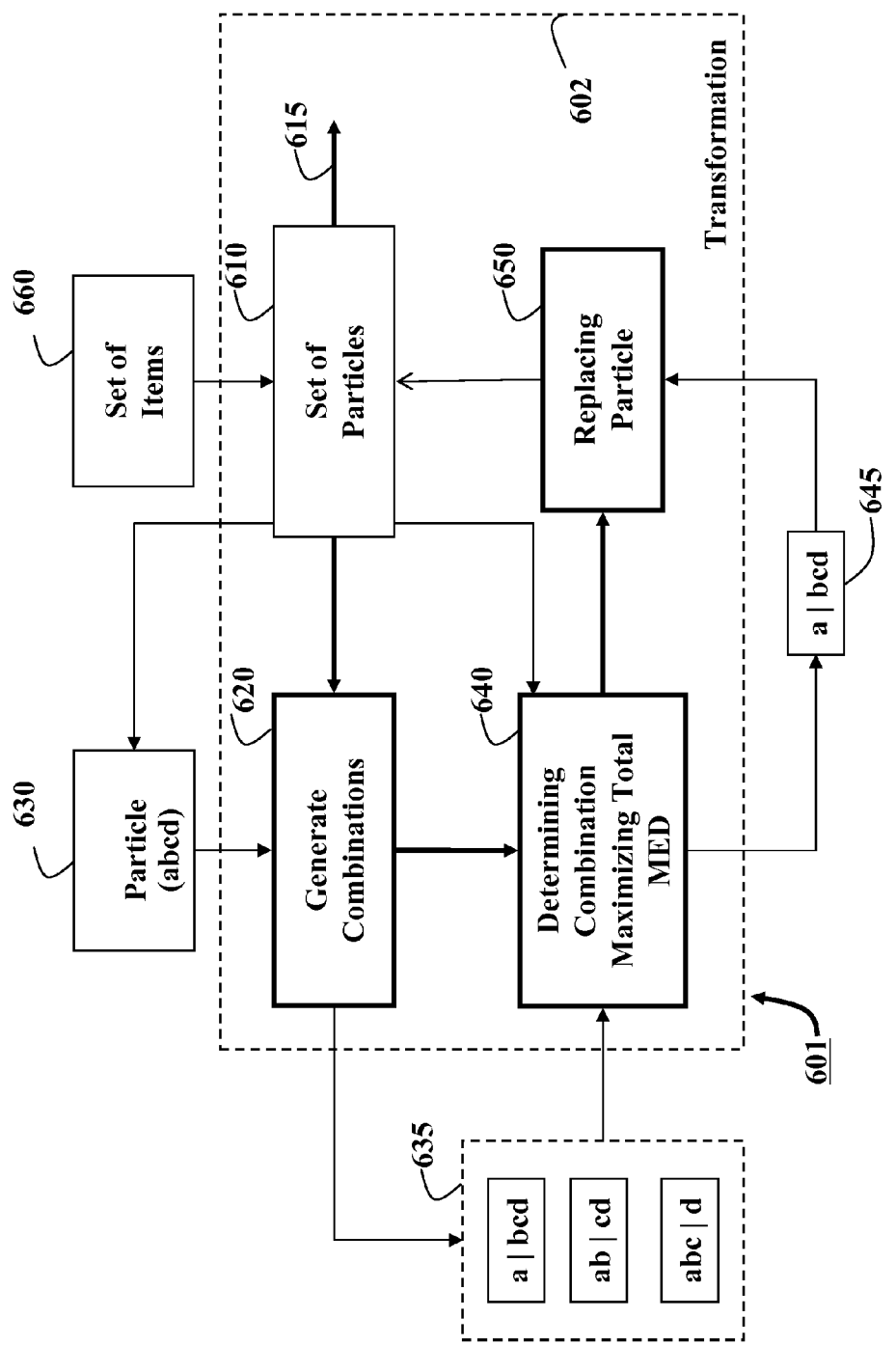
FIG. 6 is a block diagram of a method for transforming the set of particles in the output set of particles according to an embodiment of the invention.

As shown in FIG. 1, embodiments of our invention provide a method for retrieving items from a database in an information retrieval (IR) system 100. The steps of the method operate in a processor as known in the art. The processor includes memory and I/O interfaces.

The IR system includes a list of items 101 represented by words. From the word-based list 101, we generate 110 a list of items 102 represented by particles. The correspondence 111 between the items in the word-based list and the items in the particle-based list can be one-to-one, or one-to-many, when alternative pronunciations of the words are possible.

Particles are well known in the field of speech recognition. As defined herein a "particle" represents a concatenated phoneme sequence. A string of particles represents the phoneme sequence for a word, see Whittaker et al., "Particle-based language modelling," International Conference on Speech and Language Processing (ICSLP), 2000.

Up to now, particles have only been used to recognize words in an automatic speech recognizer (ASR) system. In contrast, the invention uses particles to perform information retrieval (IR).

We apply an indexer 120 to the list 102 to produce a particle-based index 121. To retrieve items, a particle-based query 103 is acquired from a user 104. The query can be derived from words in text 105, or speech 106 using the ASR.

The query 103 is used to look up the index 121 constructed from the particle-based list 102. The output, in response to the query 103, is a result list 130 of items from the word-based list 101 that correspond to the best matching items in the particle-based list 102.

To generate the particle-based list 102, in a preprocessing step, we maintain a set of unique words 149 in the list 101. We convert 150 the word-based set 149 to a set of unique particles 151. After we obtain the particle-based set 151, we can translate the words for the items in the list 101 to the corresponding particle-based items to generate 110 the particle-based list 102.

FIG. 2A shows the details of our word-based item list 101. The items are geographic points of interest, each ID 201 uniquely identifies the item 202.

FIG. 2B shows words 211 and corresponding phonemes 212. Some words can have alternate pronunciations, e.g., "HOUSES." FIG. 3 shows words 301 and corresponding particles 302 in table 300.

If an item in the word-based list has multiple pronunciations, then a Cartesian product of all possible partitioning into particles for all the words is formed, and enumerated in the particle-based list. For example, if AASHIANI can be partitioned into particles as "AA_SH_IY AA_N_IY" or as "AA_SH Y_AE_N_IH," and RESTAURANT into particles as "R_E_S_T_R_AA_N_T" or as "R_E_S_T_ER_R_AA_N_T," then all possible partitionings are enumerated in the particle-based index:

AA_SH_IY AA_N_IY R_E_S_T_R_AA_N_T,
AA_SH_IY AA_N_IY R_E_S_T_ER_R_AA_N_T,
AA_SH Y_AE_N_IH R_E_S_T_R_AA_N_T, and
AA_SH Y_AE_N_IH R_E_S_T_ER_AA_N_T.

FIG. 4 shows details of the particle-based list 102, including a unique ID 401 for each item 402 in table 400.

FIG. 5 shows a pronunciation dictionary that can be used by the ASR including particles 501 and corresponding phonemes 502 in table 500.

Our language model includes particles, e.g., an n-gram language model that includes statistics on particle n-grams.

Transformation of Particles

Embodiments of the invention are based on the realization that for the operations of the information retrieval (IR) systems it is advantageous to represent a set of words with the particles that are as different from each other as possible. For example, having particles that are as different from each other as possible allows for accurate recognition during ASR. Moreover, the embodiments are based on the further realization, that the difference between the particles can be measured using edit distance.

Accordingly, the embodiments transform a set of items 660 in an output set of particles. In various embodiments of the invention, the set of items represents a set of words suitable for use in the IR system. For example, one embodiment determines, for each word in the set of words, all possible partitionings of the word into particles and forms the set of items from unique particles derived from the set of words. In other embodiments, items in the set of items are selected from at least one of the set of words, a set of phonetic strings derived from the set of words, a set of particles derived from the set of words, and a combination thereof.

FIG. 8 shows an example of the set of particles. For each particle in the set, a minimum edit distance (MED) 810 is determined. The MED is a smallest edit distance for that particle with respect to all the other particles. Also, a total MED 820 of the set of particles is determined as summations of the MED of each particle.

FIG. 6 shows a block diagram of a method 600 for transforming the set of particles 610 in the output set of particles 615. In one embodiment, the set of the particles is formed by at least part of the set of items. Steps of the method are performed by a processor 601, as known in the art.

A transformation module 602 generates 630 combinations 635 of parts of a particle 620 in the set of particles. For example, in one embodiment, the combinations include only two parts, i.e., a prefix and a suffix of the particle. Additionally, the combinations 635 are all possible combinations of the particle. In alternative embodiment, the combinations include more than two parts.

The particle 620 is replaced 650 in the set of particles with the parts of a combination 645 maximizing 640 a total minimum edit distance (MED) of the set of particles. The transformation is repeated for all particles in the set of particles, thus transforming the set of particles in the output set of particles.

Figure 7:
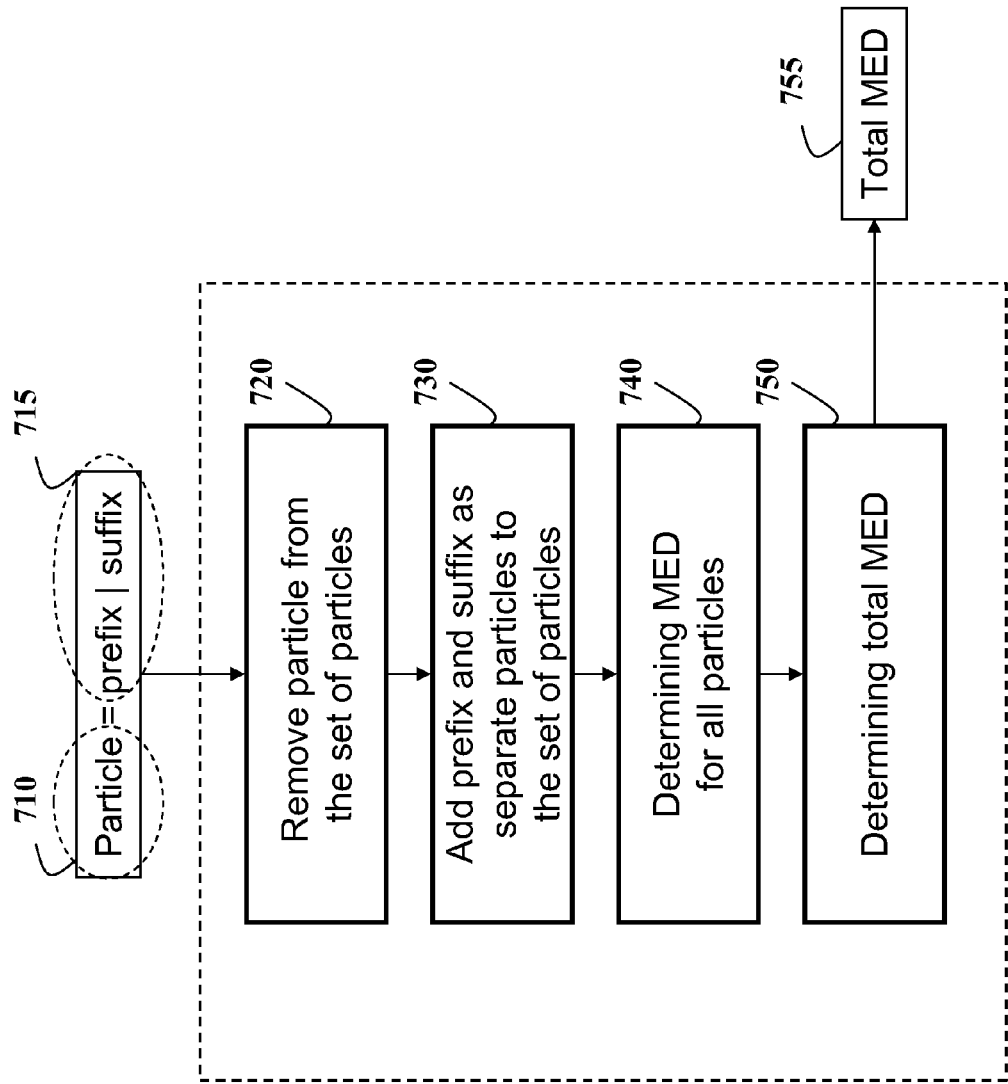
FIG. 7 is a block diagram of a method for replacing the particle with the prefix and the suffix of the particle according an embodiment of the invention.

FIG. 7 shows an example of replacing 700 the particle 710 with the prefix and the suffix 715 of the particle. The particle is removed 720 from the set of particles, and the parts of the combination, i.e., the prefix and the suffix, are added 730 into the set of particles. Next, the MED is determined 740 for each particle in the set of particles; and the MEDs are summed up to determine 750 the total MED 755 of the set of particles.

The replacing is repeated for all combinations of the particle. Specifically, the parts of the combination are removed from the set of particles and replaced with the parts of another combination of the particles, and the MED and the total MED are determined using the parts of the another combination. Finally, the parts of the combination corresponding to a maximum value of the total MED are added into the set of particles.

One embodiment preserves only unique particles in the set of particles. For example, of a part of the combination identical to a particle in the set of particles, this part is not added into the set.

During the transformation, the set of particles and, accordingly, the output set of particles, are indexed according to the set of words. For example, one embodiment creates an index map of indexes between the set of items and the set of words. The index map tracks the partitioning of the words into the particles. During the transformation, the index map becomes a tree map indexing the parts of the particles replacing the particles.

Figure 10:
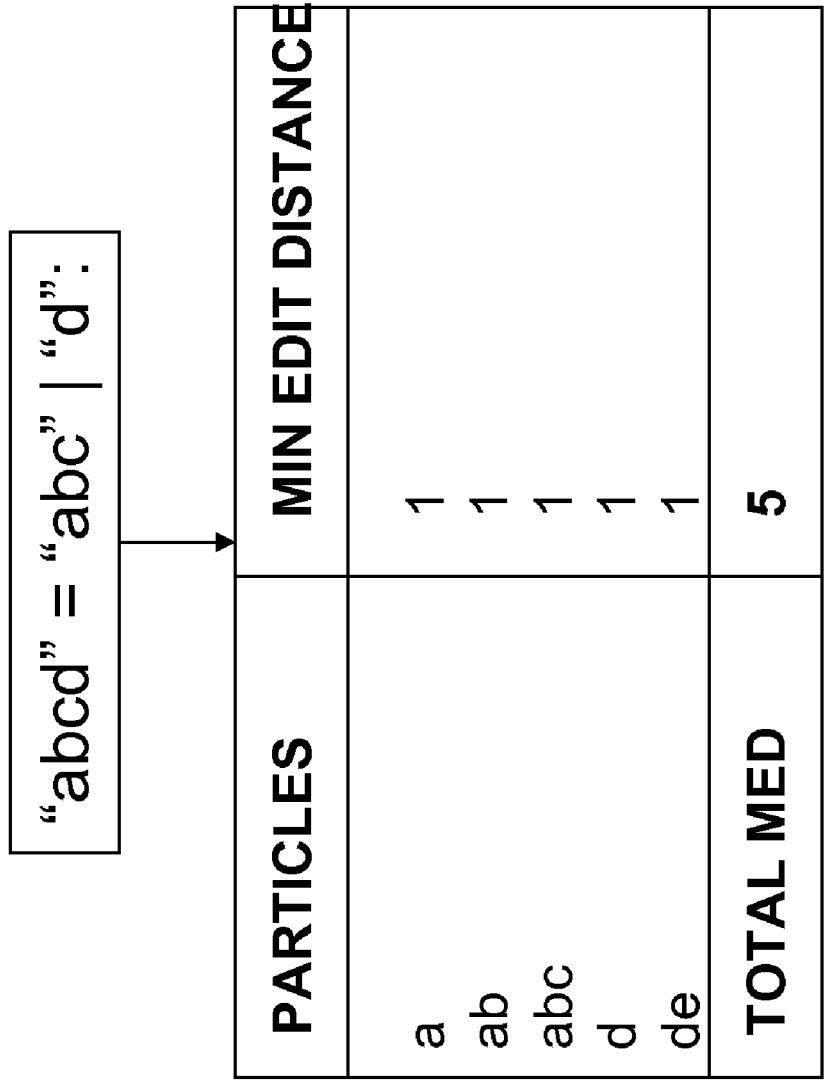
Figure 11:

FIGS. 9-11 show examples of transformation of a particle "abcd" 830 from the set of particles 810 shown in FIG. 8. All possible two parts combinations of the particle "abcd" are "a"+"bcd," as shown in FIG. 9, "ab"+"cd," as shown in FIG. 10, and "abc"+"d," as shown in FIG. 11. For each combination, the transformation module determines the MED of each particle and the total MED values for the entire set. Because the parts of the combination "a+bcd" maximizes the total MED, the value of the total MED equals seven, the parts of that combination replaces the particle "abcd."

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for transforming a set of particles formed by at least part of a set of items in an output set of particles, wherein the set of items represents a set of words suitable for use in an information retrieval system, comprising, for each particle in the set of particles, the steps of:
   generating combinations of parts of a particle in the set of particles; and
   replacing the particle in the set of particles with the parts of a combination maximizing a total minimum edit distance (MED) of the set of particles to transform the set of particles in the output set of particles, wherein the steps of the method are performed by a processor, wherein the replacing further comprises:
   removing the particle from the set of particles;
   determining, for each combination, a MED of each part of the combination, and the total MED of the set of particles, wherein the total MED includes the MED of the parts of the combination; and
   adding the parts of the combination into the set of particles corresponding to a maximum value of the total MED.

2. The method of claim 1, further comprising:
   determining the combination maximizing the total MED of the set of particles.

3. The method of the claim 1, further comprising:
   determining a MED of each particle in the set of particles, determining the total MED of the set of particles as summations of the MED of each particle.

4. The method of claim 3, further comprising:
   determining edit distances between the particle and all other particles in the set of particles; and
   selecting a smallest edit distance as the MED of the particle.

5. The method of claim 1, wherein the replacing further comprises:
   removing the particle from the set of particles;
   adding the parts of the combination into the set of particles;
   determining a MED of each particle in the set of particles; and
   determining the total MED of the set of particles.

6. The method of claim 1, further comprising:
   removing the parts of the combination from the set of particles.

7. The method of claim 1, wherein the combination includes a prefix and a suffix of the particle, wherein the generating further comprises:
   generating all possible combinations of prefixes and suffixes.

8. The method of claim 1, further comprising:
   determining, for each word in the set of words, all possible partitionings of the word into particles, such that the particles are unique; and
   forming the set of items from the particles.

9. The method of claim 8, further comprising:
   acquiring a query from a user;
   accessing the set of items using the particle-based index to determine corresponding words matching the query; and
   outputting the corresponding words as a result list for the user.

10. The method of claim 1, further comprising:
    indexing the set of items according to indexes of the set of words to produce a particle-based index.

11. The method of claim 10, further comprising:
    indexing the output set of particles based on the set of items.

12. The method of claim 1, wherein items in the set of items are selected from at least one of the set of words, a set of phonetic strings derived from the set of words, a set of particles derived from the set of words, and a combination thereof.

13. A method for generating an output set of particles representing a set of words, comprising the steps of:
    determining a set of particles from the set of words;
    generating combinations of parts of a particle in the set of particles;
    replacing the particle in the set of particles with the parts of a combination maximizing a total minimum edit distance (MED) of the set of particles, wherein the replacing further comprises:
    removing the particle from the set of particles;
    determining, for each combination, a MED of each part of the combination, and the total MED of the set of particles, wherein the total MED includes the MED of the parts of the combination; and adding the parts of the combination into the set of particles corresponding to a maximum value of the total MED; and repeating the generating and the replacing for each particle in the set of particles to generate the output set of particles, wherein the steps of the method are performed by a processor.

14. The method of claim 13, wherein the determining further comprises:

partitioning each word in the set of words into particles; and selecting the particles into the set of particles such that all particles in the set of particles are unique.

15. The method of claim 13, wherein the determining further comprises:

determining phonetic strings for each word in the set of words; and forming the set of particles based on the phonetic strings.

16. The method of the claim 13, further comprising:

determining a MED of each particle in the set of particles; and determining the total MED of the set of particles as summations of the MED of each particle.

17. The method of claim 13, further comprising:

determining edit distances between the particle and all other particles in the set of particles; and selecting a smallest edit distance as the MED of the particle.

18. A system for transforming a set of particles in an output set of particles, representing a set of words, comprising:

a transformation module configured to determine, for each particle in the set of particles, a combination of parts of the particle maximizing a total minimum edit distance (MED) of the set of particles; and a processor configured to replace the particle in the set of particles with the parts of the combination by removing the particle from the set of particles, and determining, for each combination, a MED of each part of the combination, and the total MED of the set of particles, wherein the total MED includes the MED of the parts of the combination, and adding the parts of the combination into the set of particles corresponding to a maximum value of the total MED.

19. The system of claim 18, further comprising:

means for determining a MED of each particle in the set of particles;

means for determining the total MED of the set of particles; and means for determining the combination maximizing the total MED of the set of particles.

* * * * *